US006476132B1

(12) United States Patent
Abdou-Sabet et al.

(10) Patent No.: US 6,476,132 B1
(45) Date of Patent: Nov. 5, 2002

(54) USE OF A SILANE GRAFTED POLYOLEFIN IN EPDM/POLYOLEFIN THERMOPLASTIC VULCANIZATES TO IMPROVE COMPRESSION SET

(75) Inventors: Sabet Abdou-Sabet, Akron, OH (US); Robert E. Medsker, Hartville, OH (US); Raman Patel, Akron, OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 09/360,014

(22) Filed: Jul. 23, 1999

(Under 37 CFR 1.47)

(51) Int. Cl.[7] .................................................. C06L 83/00
(52) U.S. Cl. ........................ 525/100; 525/101; 525/477; 525/479; 528/15; 528/25; 528/31
(58) Field of Search ................................. 525/100, 106, 525/254, 477, 479, 478; 528/15, 25, 31

(56) References Cited

U.S. PATENT DOCUMENTS

| | | |
|---|---|---|
| 4,803,244 A | 2/1989 | Umpleby |
| 4,889,888 A * | 12/1989 | Bassi et al. |
| 4,970,263 A * | 11/1990 | Arkles et al. |
| 5,266,627 A | 11/1993 | Meverden et al. |
| 5,597,867 A * | 1/1997 | Tsujimoto et al. |
| 5,672,660 A | 9/1997 | Medsker et al. |
| 5,741,858 A | 4/1998 | Brann et al. |
| 5,936,028 A * | 8/1999 | Medsker et al. |
| 6,013,729 A * | 1/2000 | Tsujimoto et al. |

FOREIGN PATENT DOCUMENTS

| | | | |
|---|---|---|---|
| EP | 0 651 009 A1 | 5/1995 | |
| EP | 0 855 426 A1 | 7/1998 | |
| JP | 09143277 A * | 6/1997 | .............. C08J/5/00 |
| WO | WO 97/7665 | 12/1997 | |
| WO | WO 98/21251 | 5/1998 | |
| WO | WO 98/27154 | 6/1998 | |

\* cited by examiner

*Primary Examiner*—Robert Dawson
*Assistant Examiner*—Marc S. Zimmer
(74) *Attorney, Agent, or Firm*—William A. Skinner

(57) ABSTRACT

A thermoplastic vulcanizate (TPV) from a blend of a first thermoplastic polyolefin, a second thermoplastic olefin and a rubber is described. The rubber is crosslinked with a hydrosilylation crosslinking agent. The second polyolefin includes at least one OR group pendant to a Si atom chemically attached via one or more intermediate molecules to said second polyolefin. R can be hydrogen or an alkyl of 1 to 8 carbon atoms. The OR groups can react with the hydrosilylation catalyst to reduce the compression set of the TPV.

16 Claims, No Drawings

USE OF A SILANE GRAFTED POLYOLEFIN IN EPDM/POLYOLEFIN THERMOPLASTIC VULCANIZATES TO IMPROVE COMPRESSION SET

FIELD OF INVENTION

Polyolefins with a pendant —SiOR, —Si(OR)$_2$, or —Si(OR)$_3$ groups are desirable components for thermoplastic vulcanizates from a semi-crystalline polyolefin and an unsaturated rubber crosslinked via hydrosilylation. The —SiOR groups and their hydrolysis products are generally reactive with hydrosilylation crosslinking agents. The resulting reaction product can help generate the right interaction between the polyolefin phase and rubber phase to provide enhanced physical properties such as decreased compression set.

BACKGROUND OF INVENTION

Union Carbide Corporation U.S. Pat. No. 4,803,244 teaches the preparation of thermoplastic elastomers from admixing under reaction conditions an unsaturated elastomer, a thermoplastic polymer and a multifunctional organosilicon compound (hydrosilylation agent) and a catalyst capable of hydrosilylating the carbon-carbon double bonds of the unsaturated elastomer. This patent used a high level of catalyst and produced relatively low levels of completely crosslinked rubber (gel).

Sumitomo Bakelite Co. has U.S. Pat. No. 5,597,867, which teaches the components of U.S. Pat. No. 4,803,244 along with a compatibilizing agent and if necessary paraffinic oil. The compatibilizing agent generally has a component molecularly compatible with the rubber and a component molecularly compatible with the thermoplastic resin e.g. a block copolymer, a random copolymer, or a graft copolymer in which at least two monomers are polymerized.

Advanced Elastomer Systems, L.P. has a U.S. Pat. No. 5,672,660 which teaches an improved process for the preparation of thermoplastic elastomers by hydrosilylation crosslinking using a platinum containing hydrosilylation catalyst and specific unsaturated diene-containing rubbers.

The Dow Chemical Company has U.S. Pat. No. 5,741,858, which teaches silane-crosslinked molded articles of a polyolefin elastomer and a crystalline polyolefin. Generally a silane with unsaturation and a hydrolyzable group are grafted via the unsaturation to a crystalline polyolefin and to a polyolefin elastomer. Thereafter, crosslinking is accomplished by hydrolyzing any alkoxy groups and thereafter dehydrocondensation of the silanol groups.

SUMMARY OF INVENTION

A thermoplastic vulcanizate from a first semi-crystalline polyolefin, an unsaturated rubber and a second thermoplastic polyolefin having at least one pendant —OR group from a silicon atom chemically attached to the second polyolefin. The unsaturated rubber or a portion thereof is crosslinked with a hydrosilylation crosslinking agent. The second polyolefin with said pendant —OR group facilitates optimal interaction between the first polyolefin and the unsaturated rubber. R is hydrogen or an alkyl group of 1 to 8 carbon atoms. The pendant —OR group or its hydrolysis product can chemically bond with the hydrosilylation crosslinking agent. Thus, the —OR groups can function as reaction sites to bond the second polyolefin to the rubber phase via the hydrosilylation crosslinking agent. The second polyolefin (especially if it is a semi-crystallilne polyolefin such as polyethylene or polypropylene) will preferably be located in or adjacent to the semi-crystalline polyolefin. The amount of said second polyolefin is desirably from about 2 to about 25 wt % of the weight of said first polyolefin and said unsaturated rubber. The first polyolefin is desirably polypropylene and the unsaturated rubber or a portion thereof is desirably EPDM.

DETAILED DESCRIPTION OF THE INVENTION

A thermoplastic vulcanizate from a first semi-crystalline polyolefin, an alkoxysilane or silanol functionalized polymer and an unsaturated elastomer crosslinked with a hydrosilylation crosslinking agent is disclosed. The alkoxysilane or silanol functionalized polymer functions to generate the desirable extent of interaction between the semi-crystalline polyolefin and the unsaturated rubber. Said polymer is a semicrystalline polyolefin with at least one —OR including OH group pendant directly from an Si atom, which Si atom is chemically attached via one or more intermediate molecules to said second polyolefin.

Alkoxysilane or Silanol Functionalized Polyolefin

An example according to this description is Linklon™ XPM 800H from Mitsubishi. It is generally characterized as a silane grafted semi-crystalline polypropylene with about 0.01 moles of pendant Si(OR)$_n$ groups per 100 grams of polymer where R is $C_1$–$C_8$ and n is from 1 to 3.

It can generally be any grafted polyolefin polymer with or without residual unsaturation e.g. polyolefins with at least 80 wt % more desirably at least 90 and preferably at least 95 wt % repeating units from a single olefin monomer, preferably monoolefin, having from 2 to 12 carbon atoms. Preferred polyolefins are copolymers with at least 80 wt % repeating units from ethylene and or propylene. The functional group grafted onto the polyolefin polymer could be any molecule with olefinic unsaturation, a silicon atom, and at least one —OR or OH group pendant to said silicon atom in the molecule. The variable R can be a hydrogen or an alkyl of 1 to 8 or 12 carbon atoms, an alkoxyalkyl of 2 to 8 carbon atoms such as methoxyethyl or an acetyl group. Examples of the molecules include:

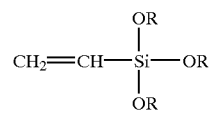

and

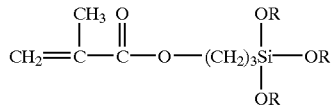

where each R is as defined above. Such molecules are available from silane manufacturers and distributors such as O.S.I. Specialty Inc in Danbury, Connecticut. The amount of the grafted Si—(OR) groups is desirably from about 0.005 to about 0.1 moles per 100 g of said grafted polyolefin polymer and more desirably is from about 0.01 5 to about 0.025 moles. Such technology is taught in Japanese Patent 57012051 A2 issued Jan. 21, 1982.

The alkoxysilane or silanol functionalized polymer can also be a copolymer including repeating units from olefins and olefinically unsaturated molecules having at least one OR group pendant to a Si atom as previously described.

Such copolymers desirably have at least 60, more desirably at least 70, and preferably at least 80 wt % repeating units from one or more olefins preferably monoolefins of from 2 to 8 or 12 carbon atoms. Preferably the olefins are ethylene and/or propylene. The amount of the olefinically unsaturated molecule, having at least one OR group pendant to a Si atom, incorporated in the copolymer is desirably from about 0.1 to 20 wt % and more desirably from about 0.5 to 7.5 wt % based on the weight of said polymer. Such copolymers and their preparation are described in U.S. Pat. No. 5,266,627 and the references therein which are hereby incorporated by reference.

The amount of the alkoxysilane or silanol functionalized polyolefin in the thermoplastic vulcanizate is desirably from about 0.1 or 5 to about 20 or 25 wt % and more desirably from about 1 or 5 to 15 or 20 wt % based upon the weight of said first thermoplastic polyolefin and alkoxysilane or silanol functionalized polymer.

Thermoplastic Vulcanizates

Thermoplastic elastomer compositions may be prepared by melt blending a thermoplastic resin and a rubber, until the blend is homogeneous. If a composition of vulcanized rubber in a thermoplastic matrix is desired, crosslinking agents (also referred to as curatives or vulcanizing agents) are added to the blend and crosslinking occurs during the mixing. This latter process is described as dynamic vulcanization.

A wide range of thermoplastic resins and rubbers and/or their mixtures have been used in the preparation of thermoplastic elastomers, including polypropylene, HDPE, LDPE, VLDPE, LLDPE, cyclic olefin homopolymers or copolymers as well as olefinic block copolymers, polystyrene, polyphenylene sulfide, polyphenylene oxide and ethylene propylene copolymer (EP) thermoplastics. The rubbers include ethylene propylene diene rubber (EPDM), acrylonitrile butadiene rubber (NBR) copolymers of isobutylene and divinylbenzene, and natural rubber (NR) as the elastomers. When the elastomer component is crosslinked, agents such as sulfur, peroxide, phenolics and ionic compounds are often used.

Hydrosilylation Agents

Hydrosilylation has also been disclosed as a crosslinking method in U.S. Pat. No. 5,672,660, hereby incorporated by reference. In this method a silicon hydride having at least two SiH groups in the molecule is reacted with the carbon-carbon multiple bonds of the unsaturated (i.e. containing at least one carbon-carbon double bond) rubber component of the thermoplastic elastomer, in the presence of the thermoplastic resin and a hydrosilylation catalyst. Silicon hydride compounds useful in the process of the invention include methylhydrogen polysiloxanes, methylhydrogen dimethylsiloxane copolymers, alkyl methyl polysiloxanes, bis(dimethylsilyl)alkanes and bis(dimethylsilyl)benzene.

Preferred silicon hydride compounds may be described by the formula

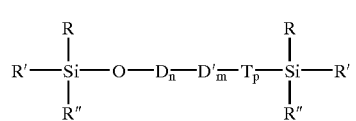

(1)

where each R, R', and R" is independently selected from the group consisting of H, alkyls comprising 1 to 20 carbon atoms, cycloalkyls comprising 4 to 12 carbon atoms and aryls. In formula (1) it is preferred that each R be independently selected from a group consisting of alkyls comprising 1 to 6 carbon atoms. Even more preferred is R=methyl, R' represents a hydrogen atom, an alkyl or alkoxy group having from 1 to about 24 carbon atoms, R" represents R or a hydrogen atom, D represents the group

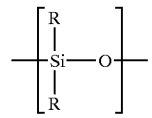

D' represents the group

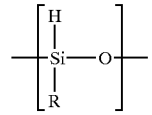

T represents the group

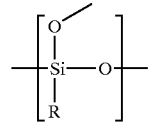

m is an integer having a value ranging from 1 to 50,
n is an integer having a value ranging from 1 to 50, and
p is an integer having a value ranging from 0 to 6.

Particularly preferred polyorganosiloxanes are those in which the silicon atom of the silicon hydride functionality is bound by heteroatoms/atoms having lone pairs of electrons. The preferred polyorganosiloxanes may also be substituted with appropriate functionality permitting solubility in the reaction media. A type of this functionalization is described in U.S. Pat. No. 4,046,930 which teaches alkylation of polyorganosiloxanes. Weight percent of alkylation should be controlled to permit adequate reaction rates which maybe reduced due to steric constraints.

The amount of silicon hydride compound useful in the process of the present invention can range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic elastomer.

Thermoplastic Resins

Thermoplastic resins useful in the compositions produced by the invention include crystalline polyolefin homopolymers and copolymers. They are desirably prepared from monoolefin monomers having 2 to 20 carbon atoms, such as ethylene, propylene, 1-butene, 1-pentene and the like, as well as copolymers derived from linear and cyclic olefins, with propylene being preferred. As used in the specification and claims the term polypropylene includes homopolymers of propylene as well as reactor copolymers of polypropylene which can contain about 1 to about 20 wt % of ethylene or an α-olefin comonomer of 4 to 20 carbon atoms, and mixtures thereof. The polypropylene can be crystalline, isotactic or syndiotactic polypropylene. Commercially available polyolefins may be used in the practice of the invention. Other thermoplastic resins which are substantially inert to the rubber, the silicon hydride and the hydrosilylation catalyst would also be suitable. Blends of thermoplastic resins may also be used.

The amount of thermoplastic resin and alkoxysilane or silanol functionalized polyolefin found to provide useful compositions is generally from about 5 to about 90 weight percent, based on the weight of the rubber and resin. Preferably, the thermoplastic resin and alkoxysilane or silanol functionalized polyolefin content will range from about 20 to about 80 percent by weight of the total polymer.

Desirably the alkoxysilane or silanol functionalized polyolefin is present in such low amounts that the thermoplastic phase of the thermoplastic vulcanizate remains melt processable after repeated exposure to water and reaction of the alkoxysilane or silanol groups of the alkoxysilane or silanol functionalized polymer. A thermoplastic vulcanizate will be considered melt processable if the physical properties generally decrease less than 10% subsequent to reprocessing.

Rubbers

Unsaturated rubbers useful to prepare thermoplastic elastomers according to the invention include monoolefin copolymer rubbers comprising non-polar, rubbery copolymers of two or more -monoolefins, preferably copolymerized with at least one polyene, usually a diene. However, unsaturated monoolefin rubber such as EPDM rubber is more suitable. EPDM is a polymer of ethylene, propylene and one or more non-conjugated diene or non-conjugated dienes, and the monomer components may be polymerized using Ziegler-Natta or metallocene catalyzed reactions, among others. Satisfactory non-conjugated dienes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB) and the like, or a combination thereof.

In one embodiment of the invention, it has been found that rubber having a structure in which the diene monomer has carbon-carbon multiple bonds which are predominately unencumbered, i.e. bonds which are sterically unhindered such as terminal or pendant double bonds, provide a greatly improved rate of cure in the hydrosilylation curing process of the invention. Included in this embodiment are structures in which the bonds either normally are unencumbered or are easily isomerized to form a sterically unencumbered double bond, which is then rapidly hydrosilated, e.g. 1,4-hexadiene or ENB. This improvement is particularly significant where a fully cured rubber component is desired. The use of rubber in which the diene component is selected from the group consisting of 5-ethylidene-2-norbornene, 5-methyl-1,4-hexadiene, 1,4-hexadiene and 5-vinyl-2-norbornene is preferred. 5-vinyl-2-norbornene is particularly preferred as a diene component of such rubber.

Butyl rubbers are also useful in the compositions of the invention. As used in the specification and claims, the term "butyl rubber" includes copolymers of an isoolefin and a conjugated monoolefin and divinyl aromatic monomers, and the halogenated derivatives derivatives of such copolymers and terpolymers. The useful butyl rubber copolymers comprise a major portion of isoolefin and a minor amount, usually less than 30 wt %, of a conjugated multiolefin. The preferred copolymers comprise about 85–99.5 wt % of a $C_{4-7}$ isoolefin such as isobutylene and about 15–0.5 wt % of a multiolefin of 4–14 carbon atoms, such as isoprene, butadiene, dimethyl butadiene, 4-methyl-1,4-pentadiene and piperylene. Commercial butyl rubber, useful in the invention, is a copolymer of isobutylene and minor amounts of isoprene. Other butyl co- and terpolymer rubbers are illustrated by the description in U.S. Pat. No. 4,916,180. Polymers from isobutylene and aromatic divinyl e.g. (divinylbenzene) are particularly preferred as an elastomer suitable for hydrosilylation crosslinking, as are the halogenated derivatives of butyl rubber such as chlorobutyl and bromobutyl. The structure and composition of co- and terpolymer rubbers from isobutylene and aromatic divinyl compounds are disclosed in U.S. Pat. Nos. 3,584,080 and 4,916,180 hereby incorporated by reference.

A further rubber suitable in the invention is natural rubber. The main constituent of natural rubber is the linear polymer cis-1,4-polyisoprene. It is normally commercially available in the form of smoked sheets and crepe. Synthetic polyisoprene can also be used with the particularly preferred synthetic polyisoprene elastomers being those that contain vinyl functionality pendant to the main polymer chain, i.e. 1,2-enchainments.

Polybutadiene is also a suitable elastomer for hydrosilylation curing, with polybutadienes that contain vinyl functionality being the most preferred.

Blends of any of the above rubbers may also be employed, rather than a single olefinic rubber.

In preparing the compositions of the invention, the amount of rubber generally ranges from about 95 to about 10 weight percent, based on the weight of the rubber and thermoplastic resin. Preferably, the rubber content will be in the range of from about 80 to about 20 weight percent of total thermoplastic resin, alkoxysilane or silanol functionalized polyolefin, and rubber.

Hydrosilylation Catalysts

It has previously been understood that any catalyst, or catalyst precursor capable of generating a catalyst in situ, which will catalyze the hydrosilylation reaction with the carbon-carbon bonds of the rubber can be used. Such catalysts have included transition metals of Group VIII such as palladium, rhodium, platinum and the like, including complexes of these metals. Chloroplatinic acid has been disclosed as a useful catalyst in U.S. Pat. No. 4,803,244 and European Application No. 651,009, which further disclose that the catalyst may be used at concentrations of 5 to 10,000 parts per million by weight and 100 to 200,000 parts per million by weight based on the weight of rubber, respectively.

It has been found in the process of the present invention that significantly lower concentrations of platinum-containing catalyst can be used, while obtaining improvement in both the speed of the reaction and the efficiency of the crosslinking. Concentrations of catalyst in the range of about 0.01 to about 20, 50, 100 or 400 parts per million by weight, expressed as platinum metal, are effective in rapidly and completely curing the rubber in the process of dynamically vulcanizing blends of thermoplastic resin and rubber. These low catalyst concentrations are particularly effective in combination with a diene-containing rubber having carbon-carbon multiple bonds which are predominately sterically unhindered Catalyst concentrations of about 0.1 to about 4 parts per million by weight based on the weight of rubber, expressed as platinum metal, are particularly preferred for the preferred EPDM rubbers.

Platinum-containing catalysts which are useful in the process of the invention are described, for example, in U.S. Pat. No. 4,578,497; U.S. Pat. No. 3,220,972; and U.S. Pat. No. 2,823,218 all of which are incorporated herein by this reference. These catalysts include chloroplatinic acid, chloroplatinic acid hexahydrate, complexes of chloroplatinic acid with sym-divinyltetramethyldisiloxane, dichloro-bis (triphenylphosphine) platinum (II), cis-dichloro-bis (acetonitrile) platinum (II), dicarbonyidichloroplatinum (II), platinum chloride and platinum oxide. Zero valent platinum metal complexes such as Karstedt's catalyst are particularly preferred, as described in U.S. Pat. No. 3,775,452; U.S. Pat.

No. 3,814,730; and U.S. Pat. No. 4,288,345 all of which are incorporated herein by this reference.

In order for the catalyst to function most efficiently in the dynamic vulcanization environment, it is important that it is inherently thermally stable, or that its activity is inhibited to prevent too rapid a reaction or catalyst decomposition. Appropriate catalyst inhibitors that are suitable to stabilize the platinum catalyst at high temperatures include 1,3,5,7-tetravinyl-1,3,5,7-tetramethylcyclotetrasiloxane and its higher analogs such as vinyl cyclic pentamer. However, other olefins that are stable above 165° C. are also useful. These include maleates, fumarates and the cyclic pentamer. It is also particularly preferred in the invention to use a catalyst that remains soluble in the reaction medium.

Additives

The thermoplastic elastomer may contain conventional additives, which can be introduced into the composition in the thermoplastic resin, the rubber, or in the blend either before, during or after the hydrosilylation and curing. Examples of such additives are antioxidants, processing aids, reinforcing and nonreinforcing fillers, pigments, waxes, rubber processing oil, extender oils, antiblocking agents, antistatic agents, ultraviolet stabilizers, plasticizers (including esters), foaming agents, flame retardants and other processing aids known to the rubber compounding art. Such additives may comprise from about 0.1 to about 300 percent by weight based on the weight of the final thermoplastic elastomer product. Fillers and extenders which can be utilized include conventional inorganics such as calcium carbonate, clays, silica, talc, titanium dioxide, carbon black and the like. Additives, fillers or other compounds which may interfere with the hydrosilylation should be added after curing reaches the desired level.

In another embodiment, it has been found that the heat aging properties of compositions prepared according to the invention can be greatly improved by the addition of a metal chelating agent to the blend. This effect is believed to be due to the fact that the hydrosilylation catalyst is in an active valence state. This form of the platinum metal accelerates degradation of the thermoplastic elastomer, particularly under conditions of elevated temperature over an extended time. Chelation prevents the metal from causing degradation.

Typical chelating agents useful for this purpose include materials such as 1,2-bis(3,5-di-ter-butyl-4-hydroxyhydrocinnamoyl)hydrazine and the like. Surprisingly, these agents may be incorporated into the composition prior to or after the hydrosilylation curing. Amounts of chelating agent ranging from about 0.025 parts per hundred parts of rubber (phr) to about 10 phr have been found to be useful, and amounts in the range of about 0.1 phr to 2 phr are preferred.

In a further embodiment of the invention, it has been demonstrated that reducing residual or unreacted silicon hydride functionality in the thermoplastic elastomer products results in compositions which have improved heat stability. Unreacted silicon hydride may be reduced or eliminated by reacting the silicon hydride with compounds containing active hydrogen, carbon-carbon multiple bonds, carbon-oxygen double bonds or carbon-nitrogen double bonds and the like. The residual silicon hydride reacts with these compounds to eliminate the silicon hydride functionality and form silicon-oxygen or carbon-silicon bonds.

Typical compounds useful for this purpose are silica and water. These agents are incorporated into the composition after the hydrosilylation cure is complete. Water may be introduced as steam anytime after cure in a single or two pass operation. As previously mentioned the majority of the thermoplastic phase remains melt processable after this rather than being crosslinked as set forth in EP 0855 426 A1 Amounts of such compounds may be estimated by measuring residual silicon hydride and adding a stoichiometric amount of the compound. One may also desire to add a stoichiometric excess if necessary to eliminate a sufficient amount of the residual silicon hydride in order to realize the desired improvement in heat aging properties. Amounts of such compounds ranging from about one mole equivalent to about 10 mole equivalents have been found to be useful, and amounts in the range of about 1 to 3 mole equivalents are preferred.

Extender Oil

The rubber processing or extender oils used in thermoplastic elastomers generally are paraffinic, naphthenic or aromatic oils derived from petroleum fractions. The type will be that ordinarily used in conjunction with the specific rubber or rubbers present in the composition, and the quantity based on the total rubber content of the thermoplastic elastomer may range from zero to several hundred parts per hundred rubber. Important to the efficiency of the catalyst is that the oils and other additives contain no or very low concentrations of compounds that are catalyst inhibitors or that interfere with the activity of the catalyst. These compounds include phosphines, amines, sulfides, thiols or other compounds that may be classified as Lewis bases. Lewis bases, or other compounds that have a pair of electrons available for donation, will react with the platinum catalyst, effectively neutralizing its activity. It has been discovered that the presence of such compounds has a surprisingly detrimental impact on hydrosilylation curing in the process of dynamic vulcanization of the rubber component of the thermoplastic elastomer compositions. If the concentration of compounds which have the chemical reactivity of Lewis bases, such as compounds containing sulfur or nitrogen, is maintained at or below a level which provides less than about 1000 ppm and 300 ppm of sulfur and nitrogen respectively, then the amount of platinum catalyst required to promote efficient hydrosilylation curing in dynamic vulcanization can be substantially reduced, usually to the range of about 4 ppm or less, without impact on the cure state of the rubber or the tensile properties of the thermoplastic elastomer product. Concentrations of sulfur and nitrogen below about 500 and 200 ppm respectively are more preferred, and concentrations of less than about 30 ppm sulfur and less than about 100 ppm nitrogen are most preferred. It has been discovered that, even at catalyst concentrations as low as 0.25 ppm, full cure of the elastomer can be achieved if the concentration of sulfur and nitrogen is within the most preferred ranges.

Most paraffinic petroleum oils for the rubber industry are derived from a crude oil distillation stream. A typical refining history would include some type of dewaxing to reduce the pour point, a solvent extraction to physically remove aromatic compounds and a hydrotreating process to chemically modify aromatic structures. Both extraction and hydrotreating result in a net increase in the total concentration of saturated hydrocarbon structures and a net decrease in the total aromatic, sulfur and nitrogen-containing compound concentration. The degree of reduction in concentration of these compounds in the oil is dependent upon the type and severity of the refining employed, and the nature of the crude oil. White and paraffinic oils have been treated more extensively than aromatic and napthenic oils and would contain a smaller concentration of aromatic, sulfur and/or nitrogen compounds. It is difficult to elucidate the exact chemical structure of these compounds due to their complexity. The tendency of an oil to interfere with platinum catalyzed hydrosilylation is directly related to the concentration of sulfur and nitrogen containing compounds, as well as compounds which contain phosphorus, tin, arsenic, aluminum and iron.

Processing

The rubber component of the thermoplastic elastomer is generally present as small, i.e. micro-size, particles within a continuous thermoplastic resin matrix, although a co-continuous morphology or a phase inversion is also possible depending upon the amount of rubber relative to plastic and the degree of cure of the rubber. The rubber is desirably at least partially crosslinked, and preferably is completely or fully crosslinked. It is preferred that the rubber be crosslinked by the process of dynamic vulcanization. As used in the specification and claims, the term "dynamic vulcanization" means a vulcanization or curing process for a rubber blended with a thermoplastic resin, wherein the rubber is vulcanized under conditions of shear at a temperature at which the mixture will flow. The rubber is thus simultaneously crosslinked and dispersed as fine particles within the thermoplastic resin matrix, although as noted above other morphologies may exist. Dynamic vulcanization is effected by mixing the thermoplastic elastomer components at elevated temperatures in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

The terms "fully vulcanized" and "fully cured" or "fully crosslinked" as used in the specification and claims means that the rubber component to be vulcanized has been cured or crosslinked to a state in which the elastomeric properties of the crosslinked rubber are similar to those of the rubber in its conventional vulcanized state, apart from the thermoplastic elastomer composition. The degree of cure can be described in terms of gel content, or conversely, extractable components. Gel content reported as percent gel (based on the weight of crosslinkable rubber) is determined by a procedure which comprises determining the amount of insoluble polymer by soaking the specimen for 48 hours in organic solvent at room temperature, weighing the dried residue and making suitable corrections based upon knowledge of the composition. Thus, corrected initial and final weights are obtained by subtracting from the initial weight the weight of soluble components, other than rubber to be vulcanized, such as extender oils, plasticizers and components of the composition soluble in organic solvent, as well as that rubber component of the product which is not intended to be cured. Any insoluble polyolefins, pigments, fillers, and the like are subtracted from both the initial and final weights. The rubber component can be described as fully cured when less than about 5%, and preferably less than 3%, of the rubber which is capable of being cured by hydrosilylation is extractable from the thermoplastic elastomer product by a solvent for that rubber. Alternatively the degree of cure may be expressed in terms of crosslink density. All of these descriptions are well known in the art, for example in U.S. Pat. Nos. 4,593,062, 5,100,947 and 5,157,081, all of which are fully incorporated herein by this reference.

The following general procedure was used in the preparation of thermoplastic elastomers by the process of the invention, as set forth in the examples. The thermoplastic resin and oil extended rubber were placed in a heated internal mixer, with the hydrosilylation agent and hydrosilylation catalyst. The hydrosilylation agent and catalyst can be incorporated into the composition by any suitable technique, for example by injection as solutions in oil or as neat components, although a dilute catalyst solution is preferred. Additives such as antioxidants, ultraviolet stabilizers and fillers may also be added as a slurry in oil. Masterbatches of the components may also be prepared to facilitate the blending process. The mixture was heated to a temperature sufficient to melt the thermoplastic component, and the mixture was masticated, with added processing oil if desired, until a maximum of mixing torque indicated that vulcanization had occurred. Mixing was continued until the desired degree of vulcanization was achieved.

The order of addition of the hydrosilylation agent and hydrosilylation catalyst was found to be important. Maximum catalyst efficiency was obtained when the hydrosilylation agent was added first to the blend, followed by the hydrosilylation catalyst. The mechanical properties of the thermoplastic elastomer products, as well as the degree of cure, were improved when this order of addition was followed.

The invention will be better understood by reference to the following examples which serve to illustrate but not limit the present process. In the examples, the following test methods were used to determine the properties of the thermoplastic elastomer products.

| | |
|---|---|
| Hardness (Shore A/D) | ASTM D 2240 |
| Ultimate tensile strength (UTS - psi) | ASTM D 412 |
| Ultimate elongation (UE - %) | ASTM D 412 |
| Modulus at 100 or 300% elongation (M1 or M3 - psi) | ASTM D 412 |
| Compression set (CS - %) Method B, 22 hrs 100° C. | ASTM D 395 |
| Oil swell (OS - %) | ASTM D 471 |

When a silane grafted polyolefin is used in an EPDM/polyolefin thermoplastic vulcanizate which has been dynamically vulcanized using hydrosilylation, improvements are observed in compression set properties of the composition with little or no changes in the other properties. A reduction in compression set of between 10 and 25% is observed. The following are examples that were formulated with a silane grafted polypropylene from Mitsubishi, Linklon XPM 800H.

TABLE I

|  | Control A | Example 1 | Control B | Example 2 | Control C | Example 3 |
|---|---|---|---|---|---|---|
| Recipes |  |  |  |  |  |  |
| Si—H (phr) | 3 | 3 | 3 | 3 | 3 | 3 |
| Elastomer | 100 | 100 | 100 | 100 | 100 | 100 |
| Pt Calalyst (pm) | 15 | 15 | 15 | 15 | 15 | 15 |
| Oil (phr) | 130 | 130 | 130 | 130 | 130 | 130 |
| Clay Filler (phr) | 42 | 42 | 42 | 42 | 42 | 42 |
| Polypropylene (phr) | 45 | 40 | 88 | 79 | 153 | 138 |
| Linklon (phr) | — | 5 | — | 9 | — | 15 |
| Shore A | 60 | 60 | 83 | 83 | 91 | 90 |
| UTS | 880 | 880 | 1500 | 1470 | 1920 | 1910 |
| UE | 380 | 330 | 470 | 410 | 500 | 490 |
| M1 | 350 | 370 | 800 | 830 | 1170 | 1090 |
| M3 | 770 | 820 | 1200 | 1260 | 1540 | 1460 |
| CS% | 28.3 | 22.0 | 43.0 | 38.8 | 52.0 | 45.0 |
| OS% | 96 | 94 | 71 | 69 | 55 | 56 |

The Elastomer in this example was Keltan P597 from DSM Copolymer in Baton Rouge, LA. This polymer contains 100 phr of oil. The amount of rubber in the table represents the rubber less the oil and the amount of oil shown in the table includes the oil added with the rubber.

Controls A, B, and C and Examples 1, 2, and 3 vary in their relative ratio of thermoplastic to rubber. The additional second polypropylene (Linklon) in the examples was substituted for an equivalent weight of conventional polypropylene in the preceeding control. The substitution typically results in similar Shore A hardness and modulus values in each control and following example. The Linklon could have been an added component but that would dilute the relative amount of other components. The compression set (CS) always decreased with the addition of Linklon and the other physical properties were generally comparable.

While the best mode and preferred embodiment of the invention has been set forth in accord with the Patent Statutes, the scope of the invention is not limited thereto, but rather is defined by the attached claims.

What is claimed is:

1. A thermoplastic elastomer composition, comprising
    a) a melt processable semi-crystalline thermoplastic polyolefin which is substantially inert to the other components of the composition,
    b) an unsaturated rubber which has been fully crosslinked by dynamic vulcanization with a hydrosilylation crosslinking agent and hydrosilylation catalyst, and is interdispersed as fine particles within said thermoplastic polyolefin, and
    c) a semi-crystalline thermoplastic functionalized polypropylene with at least one —(OR) group pendant directly from an Si atom, which Si atom is chemically attached via one or more intermediate molecules to said polypropylene, wherein R is a hydrogen or an alkyl of 1 to 8 carbon atoms, said functionalized polypropylene having been exposed to said hydrosilylation catalyst and bonded to said hydrosilylation crosslinking agent, and wherein said functionalized polypropylene is present from about 0.1 to about 25 weight percent of the combined weight of said thermoplastic polyolefin and functionalized polypropylene.

2. A thermoplastic elastomer according to claim 1, wherein said functionalized polypropylene is the reaction product of a semi-crystalline polypropylene with a silane having an —Si—OR, —Si(OR)$_2$, or —SI(OR)$_3$ group or combinations thereof wherein each OR independently is a hydroxyl or alkoxy group of 1 to 8 carbon atoms.

3. A thermoplastic elastomer according to claim 2, further including from about 0.1 to about 100 ppm of platinum, expressed as platinum metal, derived from a platinum-containing hydrosilylation catalyst.

4. A thermoplastic elastomer according to claim 1, wherein said semi-crystalline polyolefin comprises polypropylene.

5. A thermoplastic elastomer according to claim 2, having a weight ratio of about 20 to about 80 parts by weight of said combined thermoplastic polyolefin and functionalized polypropylene to about 80 to about 20 parts by weight of said unsaturated rubber.

6. A thermoplastic elastomer according to claim 5, wherein said unsaturated rubber comprises EPDM.

7. A process for preparing a thermoplastic vulcanizate composition, comprising: blending in any order
    a) a semi-crystalline thermoplastic polyolefin which is substantially inert to the other components of the composition;
    b) an unsaturated rubber;
    c) a semi-crystalline thermoplastic functionalized polypropylene, present in an amount from about 0.1 to about 25 weight percent based on the combined weight of said thermoplastic polyolefin and functionalized polypropylene, including at least one OR group bonded to a silicon atom pendantly attached to said functionalized polypropylene wherein R is a hydrogen or an alkyl of 1 to 8 carbon atoms; and
    d) a hydrosilylation crosslinking agent and hydrosilylation catalyst; chemically bonding at least a portion of said functionalized polypropylene to said hydrosilylation crosslinking agent, and fully crosslinking by dynamic vulcanization said rubber with said hydrosilylation crosslinking agent and said hydrosilylation catalyst, to form a dispersion of fine rubber particles within said thermoplastic polyolefin, wherein said blending, chemically bonding, and crosslinking steps need not be in any particular order and any one or more steps can occur concurrently.

8. A process according to claim 7, wherein said hydrosilylation catalyst includes a platinum atom.

9. A process according to claim 7, wherein said crosslinking of said unsaturated rubber occurs after at least said thermoplastic polyolefin and said unsaturated rubber are blended.

10. A process according to claim 7, wherein said crosslinking of said unsaturated rubber occurs after said thermoplastic polyolefin, said functionalized polypropylene and said unsaturated rubber are blended.

11. A process according to claim 8, wherein said hydrosilylation catalyst is present after said thermoplastic polyolefin, said functionalized polypropylene, and said unsaturated rubber are blended and said catalyst promotes both the crosslinking of said unsaturated rubber and the chemical bonding of said functionalized polypropylene to said rubber.

12. A process according to claim 7, wherein said thermoplastic polyolefin, said functionalized polypropylene and said unsaturated rubber are blended at least contemporaneously with said crosslinking of said unsaturated rubber and said chemical bonding of at least a portion of said functionalized polypropylene to said unsaturated rubber.

13. A process according to claim 11, wherein said thermoplastic polyolefin comprises polypropylene.

14. A process according to claim 13, wherein said unsaturated rubber comprises EPDM.

15. A process according to claim 12, wherein said thermoplastic polyolefin comprises polypropylene.

16. A process according to claim 15, wherein said unsaturated rubber comprises EPDM.

* * * * *